(12) United States Patent
Kalikivayi et al.

(10) Patent No.: US 9,466,066 B2
(45) Date of Patent: *Oct. 11, 2016

(54) ADAPTIVE GATHERING OF STRUCTURED AND UNSTRUCTURED DATA SYSTEM AND METHOD

(71) Applicant: Indix Corporation, Seattle, WA (US)

(72) Inventors: Satyanarayana Rao Kalikivayi, Chennai (IN); Rajesh Muppalla, Chennai (IN); Sanjay Parthasarathy, Bellevue, WA (US)

(73) Assignee: Indix Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,707

(22) Filed: Jun. 1, 2015

(65) Prior Publication Data

US 2015/0339682 A1    Nov. 26, 2015

Related U.S. Application Data

(63) Continuation of application No. 13/951,244, filed on Jul. 25, 2013, now Pat. No. 9,047,614.

(60) Provisional application No. 61/675,492, filed on Jul. 25, 2012.

(51) Int. Cl.
  *G06F 17/30* (2006.01)
  *G06Q 30/02* (2012.01)
  *G06F 17/27* (2006.01)

(52) U.S. Cl.
  CPC ....... *G06Q 30/0201* (2013.01); *G06F 17/2705* (2013.01); *G06F 17/30864* (2013.01); *G06F 17/30876* (2013.01)

(58) Field of Classification Search
  USPC ............... 707/609, 687, 690, 697, 790, 821
  See application file for complete search history.

(56) References Cited

U.S. PATENT DOCUMENTS

| | | | | |
|---|---|---|---|---|
| 7,707,053 | B2 * | 4/2010 | Veach | G06Q 30/02 705/14.1 |
| 7,912,753 | B2 * | 3/2011 | Struble | G06Q 30/02 705/14.4 |
| 8,195,559 | B2 * | 6/2012 | Heaton | G06Q 30/0275 705/37 |
| 2007/0073758 | A1 * | 3/2007 | Perry | G06F 17/30864 |
| 2010/0235329 | A1 * | 9/2010 | Koren | G06F 17/30902 707/687 |
| 2010/0235473 | A1 * | 9/2010 | Koren | G06F 17/30902 709/219 |

* cited by examiner

*Primary Examiner* — Sana Al Hashemi
(74) *Attorney, Agent, or Firm* — Schwabe, Williamson & Wyatt, P.C.

(57) ABSTRACT

Content is obtained from a webpage accessed via a URI, which URI is obtained from a URI queue. The content is parsed for price and product information according to a parse map, with the resulting parse result being stored. The priority of URIs in the URI queue is adjusted based on analysis of the parse result for changes in price and product attributes and according to other criteria. The parse map may be one associated with the URI or a general purpose parse maps. The parse result may be validated by human- and machine-based systems, including by graphically labeling price and product information in the content for human confirmation or correction.

20 Claims, 13 Drawing Sheets

ADAPTIVE GATHERING OF STRUCTURED AND UNSTRUCTURED DATA SYSTEM AND METHOD

CROSS-REFERENCE TO RELATED APPLICATIONS

This application is a Continuation of U.S. Non-Provisional patent application Ser. No. 13/951,244; filed Jul. 25, 2013; titled ADAPTIVE GATHERING OF STRUCTURED AND UNSTRUCTURED DATA SYSTEM AND METHOD, and naming inventors Satyanarayana Rao KALIKIVAY, Rajesh MUPPALLA, and Sanjay PARTHASARATHY. Application Ser. No. 13/951,244 claims priority to U.S. Provisional Patent Application No. 61/675,492, filed Jul. 25, 2012, titled PRICE, PRICE ATTRIBUTE, PRODUCT, AND PRODUCT ATTRIBUTE; and naming inventors Satyanarayana Rao KALIKIVAY, Sanjay PARTHASARATHY, Praveen SELVAM, and Rajesh MUPPALLA. The above-cited applications are hereby incorporated by reference, in entirety, for all purposes.

FIELD

This disclosure relates to a method and system to efficiently obtain information from third-party sources on the Internet and to parse the information into price, product, and other information.

BACKGROUND

The following description includes information that may be useful in understanding the present invention. It is not an admission that any of the information provided herein is prior art or relevant to the presently claimed invention, or that any publication specifically or implicitly referenced is prior art.

Search engines, such as Google, Bing, and others search and index vast quantities of information on the Internet. "Crawlers" (a.k.a. "spiders") follow URLs obtained from a "queue" to obtain content, usually from web pages. The crawlers or other software store and index some of the content. Users can then search the indexed content, view results, and follow hyperlinks back to the original source or to the stored content (the stored content often being referred to as a "cache"). Computing resources to crawl and index, however, are not limitless. The URL queues are commonly prioritized to direct crawler resources to web page servers which can accommodate the traffic, which do not block crawlers (such as according to "robots.txt" files commonly available from webpage servers), which experience greater traffic from users, and which experience more change in content.

Conventional search engines, however, are not focused on price and product information. If a price changes on a webpage, but the rest of the webpage remains the same, traditional crawlers (or the queue manager) will not prioritize the webpage position in the queue, generally because the price is a tiny fraction of the overall content and the change is not labeled as being significant; conversely, if the webpage changes, but the price and/or product information remains the same, the change in webpage content may cause a traditional crawler to prioritize the webpage position in the queue due to the overall change in content, notwithstanding that that price and product information remained the same.

DETAILED DESCRIPTION

Figure 1:
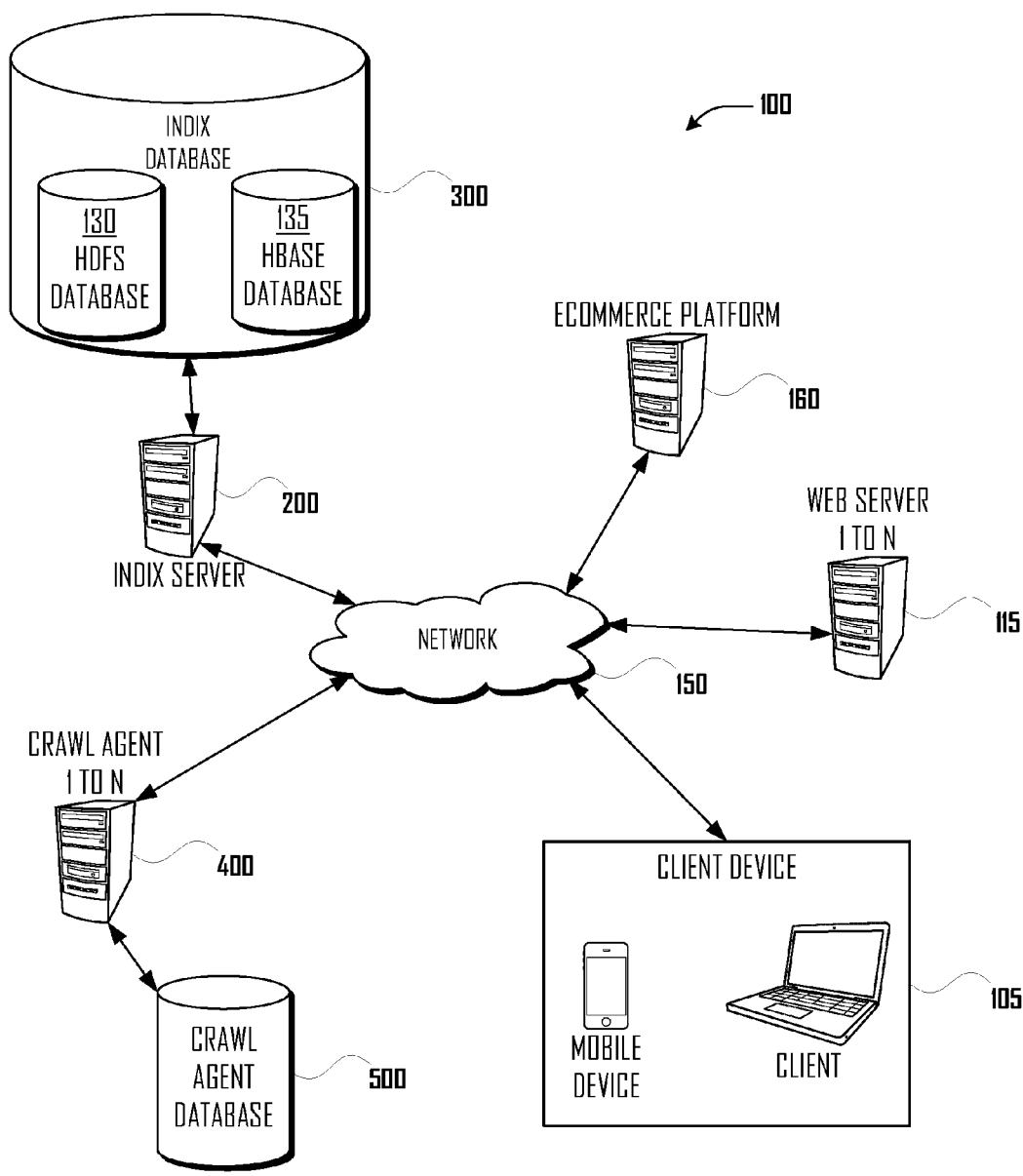
FIG. 1 is a network and device diagram illustrating exemplary computing devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling or connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in several of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

As used herein, a Uniform Resource Identifier ("URI") is a string of characters used to identify a resource on a computing device and/or a network, such as the Internet. Such identification enables interaction with representations of the resource using specific protocols. "Schemes" specifying a syntax and associated protocols define each URI.

The generic syntax for URI schemes is defined in Request for Comments ("RFC") memorandum 3986 published by the Internet Engineering Task Force ("IETF"). According to RFC 3986, a URI (including a URL) consists of four parts:
  <scheme name>: <hierarchical part>[?<query>] [#<fragment>]

A URI begins with a scheme name that refers to a specification for assigning identifiers within that scheme. The scheme name consists of a letter followed by any combination of letters, digits, and the plus ("+"), period ("."), or hyphen ("-") characters; and is terminated by a colon (":").

The hierarchical portion of the URI is intended to hold identification information that is hierarchical in nature. Often this part is delineated with a double forward slash ("//"), followed by an optional authority part and an optional path.

The optional authority part holds an optional user information part (not shown) terminated with "@" (e.g. username:password@), a hostname (i.e., domain name or IP address, here "example.com"), and an optional port number preceded by a colon ":".

The path part is a sequence of one or more segments (conceptually similar to directories, though not necessarily representing them) separated by a forward slash ("/"). If a URI includes an authority part, then the path part may be empty.

The optional query portion is delineated with a question mark and contains additional identification information that is not necessarily hierarchical in nature. Together, the path part and the query portion identify a resource within the scope of the URI's scheme and authority. The query string syntax is not generically defined, but is commonly organized as a sequence of zero or more <key>=<value> pairs separated by a semicolon or ampersand, for example:
  key1=value1;key2=value2;key3=value3 (Semicolon), or
  key1=value1&key2=value2&key3=value3 (Ampersand)

Much of the above information is taken from RFC 3986, which provides additional information related to the syntax and structure of URIs. RFC 3986 is hereby incorporated by reference, for all purposes.

As used herein, a "Crawl Agent" is a process, generally executed on or by a server, which requests content from other servers on the Internet, often though not exclusively relative to the World Wide Web. An example of Crawl Agents 1 to N is illustrated in FIG. 1 as Crawl Agent 400; multiple Crawl Agents 400 may be present and may be represented by this illustration.

As used herein, "Product" shall be understood to mean "products or services." References to "Product Attribute" herein shall be understood to mean "product or service attribute."

As used herein, an "iPID" or iPID 330 is a unique identifier assigned within the Indix System to a URI for a product. The iPID 330 may be, for example, a hash of URI 305.

As used herein, an "MPID" or MPID 332 is an iPID 330 assigned to a Product by the MPID Assigner Routine 1200. An MPID is generally meant to identify a single Product, generally produced by a common manufacturer, though the Product may be distributed and sold by multiple parties.

iPIDs are associated with Price Attribute 340 records and Product Attribute 345 records.

A Price Attribute 340 record may comprise one or more records comprising, for example, values which encode an iPRID which may be an identifier for a price observed at a particular time, an iPID (discussed above), a Product Name (a "Product Name" value in this record may also be referred to herein as a "Product"), a Standard Price, a Sale, a Price, a Rebate amount, a Price Instructions record (containing special instructions relating to a price, such as that the price only applies to students), a Currency Type, a Date and Time Stamp, a Tax record, a Shipping record (indicating costs relating to shipping to different locations, whether tax is calculated on shipping costs, etc.), a Price Validity Start Date, a Price Validity End Date, a Quantity, a Unit of Measure Type, a Unit of Measure Value, a Merchant Name (with the name of a merchant from whom the Product is available; a "Merchant Name" value in this record may also be referred to herein as a "Merchant"), a Store Name (a Merchant may have multiple stores; a "Store Name" value in this record may also be referred to herein as a "Store"), a User ID, a Data Channel (indicating the source of the Price Attribute 340 record, such as an online crawl, a crowdsource, a licensed supplier of price information, or from a merchant), a Source Details record (for example, indicating a URI, a newspaper advertisement), an Availability Flag, a Promotion Code, a Bundle Details record (indicating products which are part of a bundle), a Condition Type record (indicating new, used, poor, good, and similar), a Social Rank record (indicating a rank of "likes" and similar of the price), a Votes/Likes record (indicating a number of "likes" and similar which a Price or Product has received), a Price Rank record, a Visibility Indicator record (indicating whether the price is visible to the public, whether it is only visible to a Merchant, or the like), a Supply Chain Reference record (indicating whether the price was obtained from a retailer, a wholesaler, or another party in a supply chain), a Sale Location (indicating a geographic location where the product is available at the price), a Manufactured Location record (indicating where the product was produced or manufactured), a Launch Date record (indicating how long the product has been on the market), and an Age of Product record (indicating how long the product was used by the user). When capitalized herein, the foregoing terms are meant to refer to values in a Price Attribute 340 record.

A Product Attribute 345 record may comprise, for example, values encoding features of or describing a Product. The entire Product Attribute 345 schema may comprise thousands of columns, though only tens or hundreds of the columns may be applicable to any given Product. Product Attributes 345 are described herein and in co-pending application Ser. No. 13/951,248, titled "Data Refining Engine for High Performance Analysis System and Method," and filed contemporaneously herewith. An example set of values in a Product Attribute 345 record for a ring is as follows: Title, "Sterling Silver Diamond & Blue Topaz Ring;" Brand, "Blue Nile;" Category (such as, for example, a Category 335 in a category schema), "rings;" Metal Name, "silver;" Stone Shape, "cushion;" Stone Name, "topaz;" Width, "3 mm;" Stone Color, "blue;" Product Type, "rings," Birthstone, "September;" and Setting Type, "prong." An example set of Product Attributes 345 for a shoe is as follows: Brand, "Asics;" Category (such as, for example, a Category 335 in a category schema), "Men's Sneakers & Athletic;" Shoe Size, "8;" Product Type, "wrestling shoes," Color, "black;" Shoe Style, "sneakers;" Sports, "athletic;" Upper Material, "mesh." When capitalized herein, the foregoing terms are meant to refer to values in a Price Attribute 340 record.

As used herein, "Content" comprises text, graphics, images (including still and video images), audio, graphical arrangement, and instructions for graphical arrangement, including HTML and CSS instructions which may, for example, be interpreted by browser applications.

As used herein, a "Listing Page" is a webpage which contains information associated with multiple iPIDs.

As used herein, a "Product Page" is a webpage which contains information associated with a single IPID.

As used herein, "Event" is information generally in news or current events. Events may be found in Content. Listing Pages, Product Pages, and Event Pages are all examples of Webpage Types 350.

Generally, a Crawl Agent 400 obtains Content, such as URI-Content Instance 310, from a webpage served by Web Server 115. The Crawl Agent 400 accesses the webpage via URI 305, which URI is obtained by the Crawl Agent 400 from a URI Queue 355. The URI Queue 355 is maintained by the Indix Server 200 through execution of the Parse Routine 700, the Seeder Routine 800, and the URI Queue Manager Routine 900. The Parse Routine 700 parses URI-Content Instance 310 for price and product information, such as Price Attributes 340 and Product Attributes 345 (referred to herein together as "Attributes 340/345"), according to a Parse Map 315, and stores the Parse Result 325. The Seeder Routine 800 identifies URIs 305 which contain Attributes 340/345 and adds URIs to the URI Queue 355. The URI Queue Manager Routine 900 adjusts the Time to Next Check 360 of each URI 305 in the URL Queue 355 based on factors such as, for example, analysis of the Parse Result 325 and observed changes in Attributes 340/345 associated with iPIDs 330, whether users searching the Parse Results 325 express interest in an iPID 330, an MPID 332, or a Category 335 associated with the Parse Result 325, the Web Server's 115 functional or declared availability, changes in Attributes 340/345 for a Category 335 associated with the iPID 330 (such as a "Price" Attribute), whether the Parse Result 325 is consistent with a Listing Page or a Product Page or another Webpage Type 350, when the URI was last crawled, and according to other criteria.

The Parse Map 315 applied to the URI-Content Instance 310 to convert the URI-Content Instance 310 into Parse Result 325 is selected based on whether there is an existing Parse Map 315 associated with the URI 305, with an iPID 330 associated with the URI 305 (or an Equivalent iPID 334), or associated with a website, domain name, ecommerce platform (as may be provided by Ecommerce Platform 160), or other Parse Map Determiner 320 associated with the URI or URI-Content Instance 310. If there is no Parse Map 315 associated with the URI 305, then one or more general purpose Parse Maps 315 may be selected and used to convert the URI-Content Instance 310 into Parse Result 325. Multiple Parse Maps 315 may be selected, the results thereof screened for data type mis-matches, and the results thereof validated and set as the revised Parse Result 325.

The Parse Map 315 and Parse Result 325 may be validated by human- and machine-based systems. A Parse Map Validation Routine 1000 assists with human-based validation by graphically labeling Parse Results 325 in a webpage or other graphical communication media for human confirmation or correction. The Parse Map Validation Routine 1000 is discussed in relation to FIG. 10, while an example of the output of an embodiment of the Parse Map Validation Routine 1000 is illustrated and discussed in relation to FIG. 11.

FIG. 1 is a network and device diagram illustrating exemplary computing devices configured according to embodiments disclosed in this paper. Illustrated in FIG. 1 are an Indix Server 200 and an Indix Database 300. The Indix Server 300 may execute a Cluster Manager Routine 260 to manage clusters of Crawl Agents 400 and clusters of instances of the Indix Server 200. The Indix Server 200 may also execute a Parser Routine 700 to parse a URI-Content Instance 310 into Parse Result 325, discussed further in relation to FIG. 7. The Indix Server 200 may also execute a Seeder Routine 800 to add new URIs to the URI Queue 355, discussed further in relation to FIG. 8, a URI Queue Manager Routine 900 to manage the URI Queue 355, discussed further in relation to FIG. 9, and a Parse Map Validation Routine 1000 to validate Parse Result 325, discussed further in relation to FIGS. 10 and 11.

The Indix Database 300 is illustrated as comprising an HDFS Database 130, which may store the URI-Content Instance 310 in, for example, a Hadoop distributed file system, and an HBASE Database 135, which may store the Parse Result 325 in, for example, an HBase non-relational distributed database. The Indix Database 300 is discussed further in relation to FIG. 3.

Also illustrated in FIG. 1 is a Crawl Agent 400, representing Crawl Agents 1 to N, and a Crawl Agent Database 500. The Crawl Agent 400 (including Agents 1 to N) may execute the URI Check Routine 600. The Crawl Agent 400 is discussed further in relation to FIG. 4.

Also illustrated in FIG. 1 is a Client Device 105, such as a mobile or non-mobile computer device. The Client Device 105 is an example of computing devices such as, for example, a mobile phone, a tablet, laptop, personal computer, gaming computer, or media playback computer. The Client Device 105 represents any computing device capable of rendering Content in a browser or an equivalent user-interface. Client Devices are used by "users." The Client Device 105 may be utilized to search the Parse Results 325 and to validate and improve the Parse Map 315 associated with a URI 305.

Also illustrated in FIG. 1 is a Web Server 115, which may serve Content in the form of webpages or equivalent output in response to URIs, such as URI 305.

Also illustrated in FIG. 1 is an Ecommerce Platform 160, which may provide ecommerce services, such as website and/or webpage hosting via webpage templates comprising HTML and CSS elements. Customers of Ecommerce Platform 160 may complete the webpage templates with Content and serve the webpages and websites from, for example, Web Server 115.

Interaction among devices illustrated in FIG. 1 may be accomplished, for example, through the use of credentials to authenticate and authorize a machine or user with respect to other machines.

In FIG. 1, the computing machines may be physically separate computing devices or logically separate processes executed by a common computing device. Certain components are illustrated in FIG. 1 as connecting directly to one another (such as, for example, the Indix Database 300 to the Indix Server 200), though the connections may be through the Network 150. If these components are embodied in separate computers, then additional steps may be added to the disclosed invention to recite communicating between the components.

The Network 150 comprises computers, network connections among the computers, and software routines to enable communication between the computers over the network connections. Examples of the Network 150 comprise an Ethernet network, the Internet, and/or a wireless network, such as a GSM, TDMA, CDMA, EDGE, HSPA, LTE or other network provided by a wireless service provider, or a television broadcast facility. Connection to the Network 150 may be via a Wi-Fi connection. More than one network may be involved in a communication session between the illustrated devices. Connection to the Network 150 may require that the computers execute software routines which enable, for example, the seven layers of the OSI model of computer networking or equivalent in a wireless phone network.

This paper may discuss a first computer as connecting to a second computer (such as a Crawl Agent 400 connecting to the Indix Server 200) or to a corresponding datastore (such as to Indix Database 300); it should be understood that such connections may be to, through, or via the other of the two components (for example, a statement that a computing device connects with or sends data to the Indix Server 200 should be understood as saying that the computing device may connect with or send data to the Indix Database 300). References herein to "database" should be understood as equivalent to "datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Figure 2:
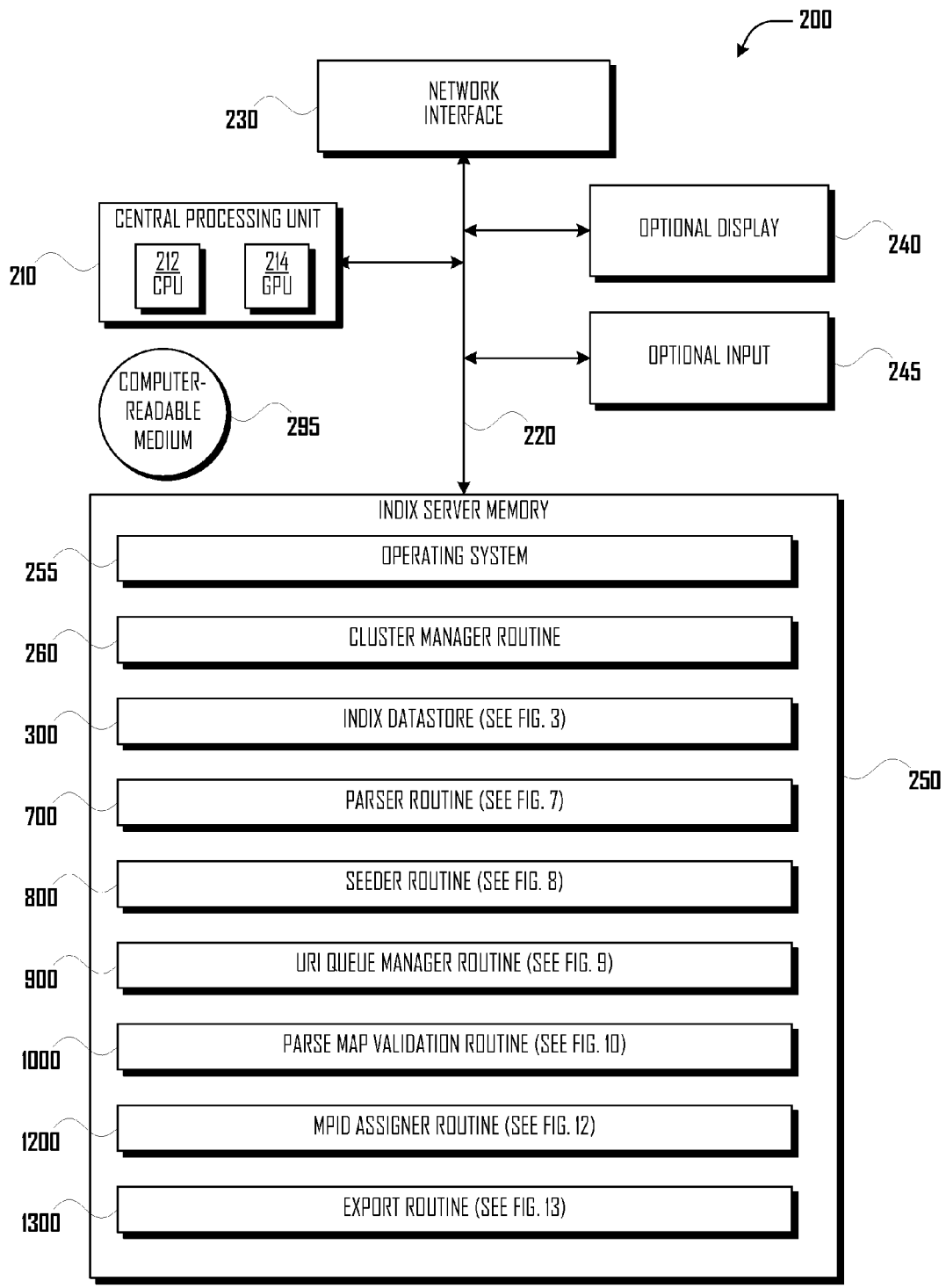
FIG. 2 is a functional block diagram of an exemplary Indix Server 200 computing device and some data structures and/or components thereof.

FIG. 2 is a functional block diagram of an exemplary Indix Server 200 computing device and some data structures and/or components thereof. The Indix Server 200 in FIG. 2 comprises at least one Processing Unit 210, Indix Server Memory 250, a Display 240 and Input 245, all interconnected along with the Network Interface 230 via a Bus 220. The Processing Unit 210 may comprise one or more general-purpose Central Processing Units ("CPU") 212 as well as one or more special-purpose Graphics Processing Units ("GPU") 214. The components of the Processing Unit 210 may be utilized by the Operating System 255 for different functions required by the routines executed by the Indix Server 200. The Network Interface 230 may be utilized to form connections with the Network 150 or to form device-to-device connections with other computers. The Indix Server Memory 250 generally comprises a random access memory ("RAM"), a read only memory ("ROM"), and a permanent mass storage device, such as a disk drive or SDRAM (synchronous dynamic random-access memory).

The Indix Server Memory 250 stores program code for software routines, such as, for example, Cluster Manager Routine 260, Parser Routine 700, Seeder Routine 800, URI Queue Manager Routine 900, and Parse Map Validation Routine 1000, as well as, for example, browser, email client and server routines, client applications, and database applications (discussed further below). Additional data groups for routines, such as for a webserver and web browser, may also be present on and executed by the Indix Server 200 and the other computers illustrated in FIG. 1. Webserver and browser routines may provide an interface for interaction among the computing devices, for example, through webserver and web browser routines which may serve and respond to data and information in the form of webpages and html documents or files. The browsers and webservers are meant to illustrate machine- and user-interface and user-interface enabling routines generally, and may be replaced by equivalent routines for serving and rendering information to and in interfaces in a computing device (whether in a web browser or in, for example, a mobile device application).

In addition, the Indix Server Memory 250 also stores an Operating System 255. These software components may be loaded from a non-transient Computer Readable Storage Medium 295 into Indix Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supporting input modalities, Input 245, such as, for example, a touchscreen, a camera, a keyboard, a mouse, a trackball, a stylus, motion detectors, and a microphone. The Input 245 may also serve as a Display 240, as in the case of a touchscreen display which also serves as Input 245, and which may respond to input in the form of contact by a finger or stylus with the surface of the Input 245.

Figure 3:
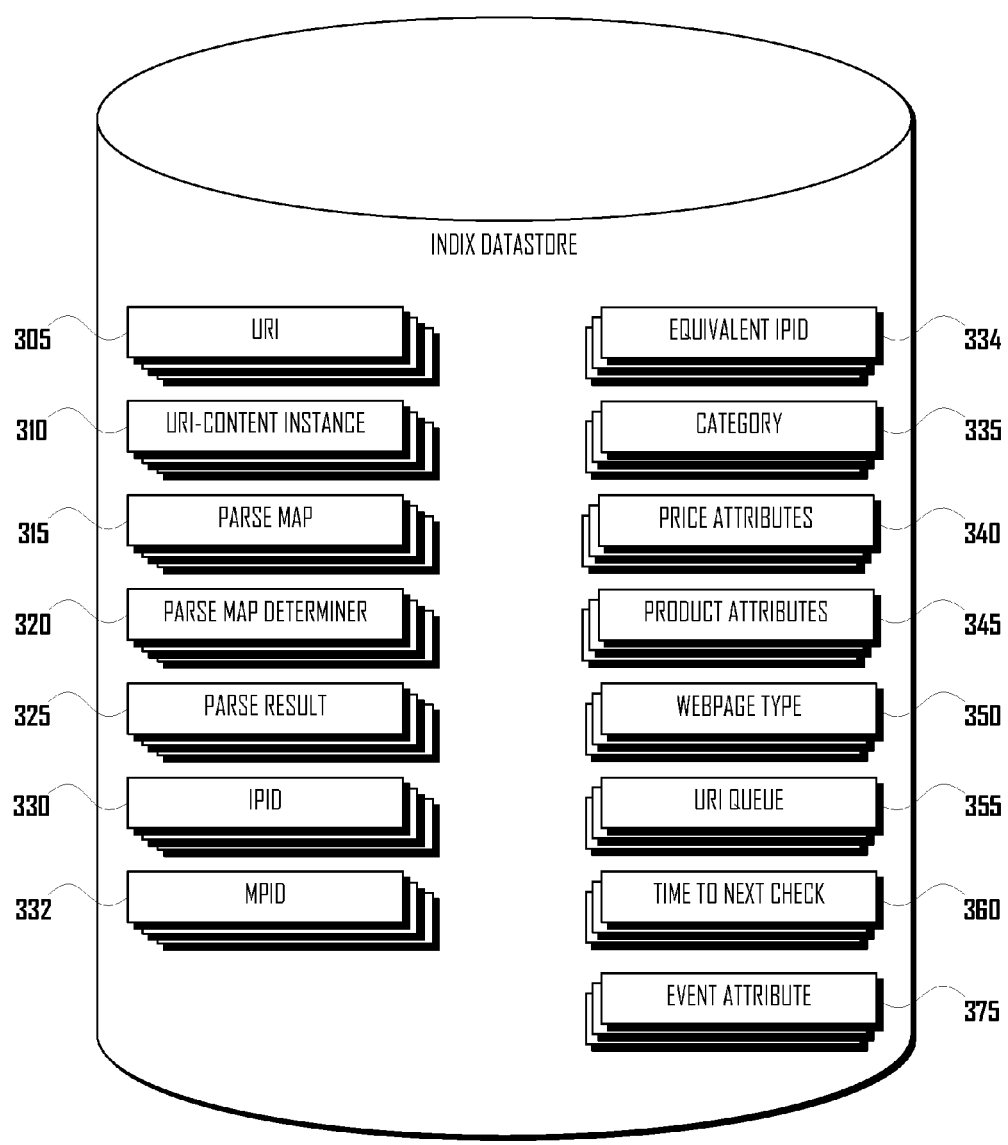
FIG. 3 is a functional block diagram of the Indix Datastore 300 illustrated in the computing device of FIG. 2.

The computing device 200 may also comprise or communicate via Bus 220 with Indix Datastore 300, illustrated further in FIG. 3. In various embodiments, Bus 220 may comprise a storage area network ("SAN"), a high speed serial bus, and/or other suitable communication technology. In some embodiments, the Indix Server 200 may communicate with the Indix Datastore 300 via Network Interface 230. The Indix Server 200 may, in some embodiments, include many more components than those shown in this Figure. However, it is not necessary that all of these generally conventional components be shown in order to disclose an illustrative embodiment.

FIG. 3 is a functional block diagram of the Indix Datastore 300 illustrated in the computing device of FIG. 2. The components of the Indix Datastore 300 are data groups used by routines and are discussed further herein in the discussion of other of the Figures. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
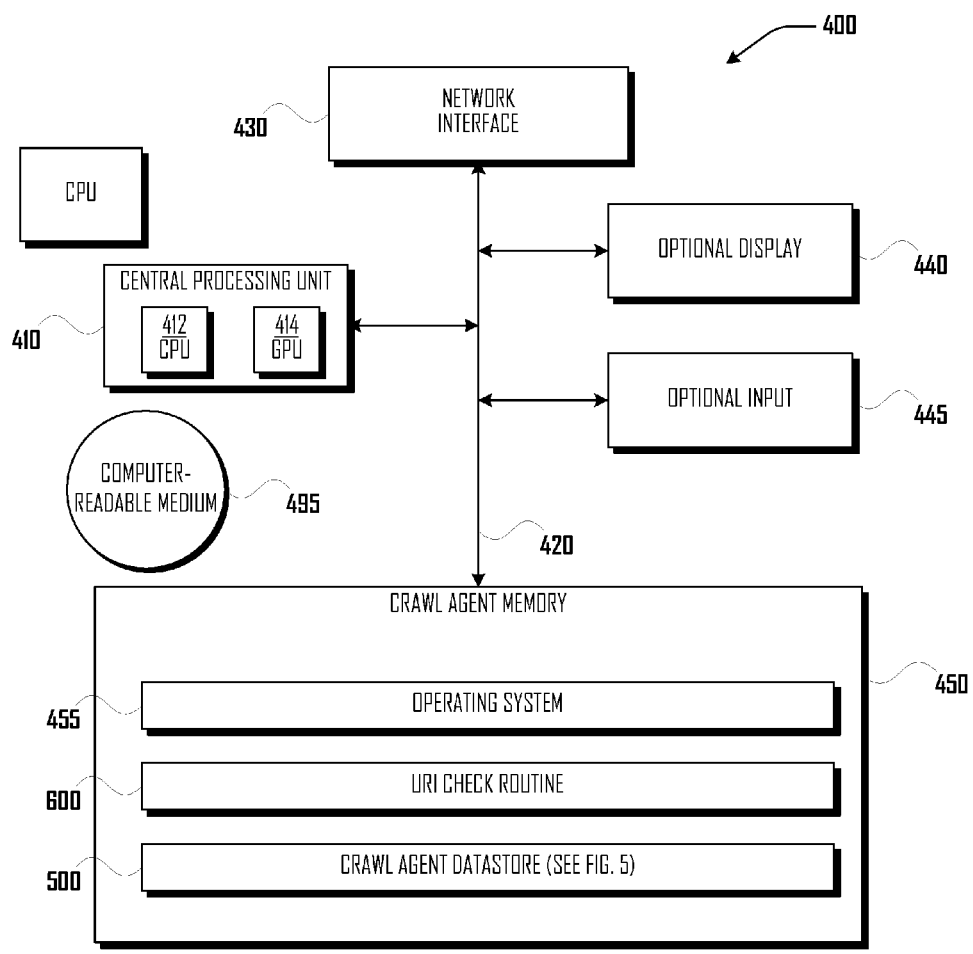
FIG. 4 is a functional block diagram of an exemplary Crawl Agent 400 computing device and some data structures and/or components thereof.

FIG. 4 is a functional block diagram of an exemplary Crawl Agent 400 computing device and some data structures and/or components thereof. The Crawl Agent 400 in FIG. 4 comprises at least one Processing Unit 410, Crawl Agent Memory 450, a Display 440 and Input 445, all interconnected along with the Network Interface 430 via a Bus 420. The Processing Unit 410 may comprise one or more general-purpose Central Processing Units ("CPU") 412 as well as one or more special-purpose Graphics Processing Units ("GPU") 414. The components of the Processing Unit 410 may be utilized by the Operating System 455 for different functions required by the routines executed by the Crawl Agent 400. The Network Interface 430 may be utilized to form connections with the Network 150 or to form device-to-device connections with other computers. The Crawl Agent Memory 450 generally comprises a random access memory ("RAM"), a read only memory ("ROM"), and a permanent mass storage device, such as a disk drive or SDRAM (synchronous dynamic random-access memory).

The Crawl Agent Memory 450 stores program code for software routines, such as, for example, the URI Check Routine 600, as well as, for example, browser, email client and server routines, client applications, and database applications (discussed further below). Additional data groups for routines, such as for a webserver and web browser, may also be present on and executed by the Crawl Agent 400 and the other computers illustrated in FIG. 1. Webserver and browser routines may provide an interface for interaction among the computing devices, for example, through webserver and web browser routines which may serve and respond to data and information in the form of webpages and html documents or files. The browsers and webservers are meant to illustrate machine- and user-interface and user-interface enabling routines generally, and may be replaced by equivalent routines for serving and rendering information to and in interfaces in a computing device (whether in a web browser or in, for example, a mobile device application).

In addition, the Crawl Agent Memory 450 also stores an Operating System 455. These software components may be loaded from a non-transient Computer Readable Storage Medium 495 into Crawl Agent Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 430).

The computing device 400 may also comprise hardware supporting input modalities, Input 445, such as, for example, a touchscreen, a camera, a keyboard, a mouse, a trackball, a stylus, motion detectors, and a microphone. The Input 445 may also serve as a Display 440, as in the case of a touchscreen display which also serves as Input 445, and which may respond to input in the form of contact by a finger or stylus with the surface of the Input 445.

Figure 5:
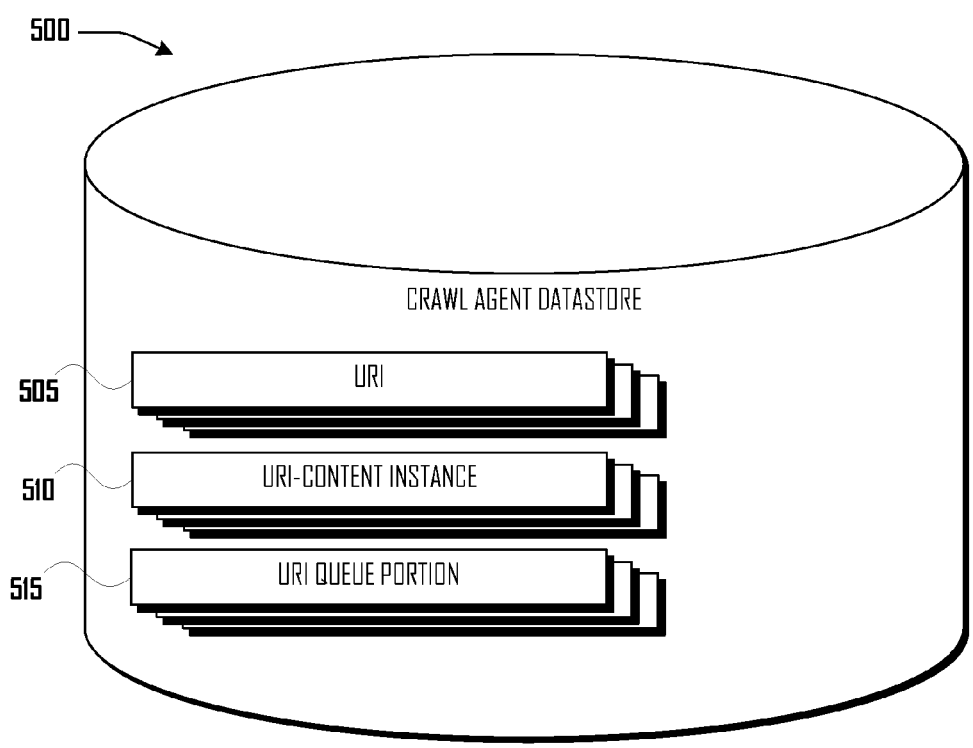
FIG. 5 is a functional block diagram of the Crawl Agent Datastore 500 illustrated in the computing device of FIG. 4.

The computing device 400 may also comprise or communicate via Bus 420 with Crawl Agent Datastore 500, illustrated further in FIG. 5. In various embodiments, Bus 420 may comprise a storage area network ("SAN"), a high speed serial bus, and/or via other suitable communication technology. In some embodiments, the Crawl Agent 400 may communicate with the Crawl Agent Datastore 500 via Network Interface 430. The Crawl Agent 400 may, in some embodiments, include many more components than those shown in this Figure. However, it is not necessary that all of these generally conventional components be shown in order to disclose an illustrative embodiment.

FIG. 5 is a functional block diagram of the Crawl Agent Datastore 500 illustrated in the computing device of FIG. 4. The components of the Crawl Agent Datastore 500 are data groups used by routines and are discussed further herein in the discussion of other of the Figures. The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6:
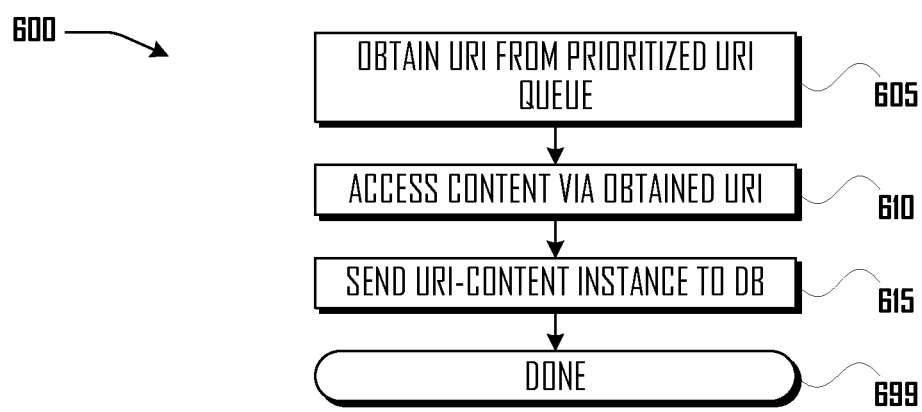
FIG. 6 is a flowchart illustrating an embodiment of a URI Check Routine 600 in which the Crawl Agent 400 obtains a URI 305 from a URI Queue 355 and obtains a URI-Content Instance 310.

FIG. 6 is a flowchart illustrating an embodiment of a URI Check Routine 600 in which the Crawl Agent 400 obtains a URI 305 from a URI Queue 355 and obtains a URI-Content Instance 310. At block 605, the URI Check Routine 600 obtains a URI 305 from, for example, the Indix Server 200 and, for example, the URI Queue Manager Routine 900 and the URI Queue 355. The URIs 305 may be obtained in units comprising more than one URI 305. At block 610, the URI Check Routine 600 utilizes the URI 305 to contact, for example, the Web Server 115 and obtain Content, which Content is referred to herein as a URI-Content Instance 310. At block 615, the URI Check Routine 600 and/or the Web Server 115 transmits the URI-Content Instance 310 to the Indix Server 300 where it may be stored, for example, in the HDFS Database 130. At block 699, the URI Check Routine 600 may conclude and/or may continue to loop over URIs 305 in the URI Queue 355.

Figure 7:
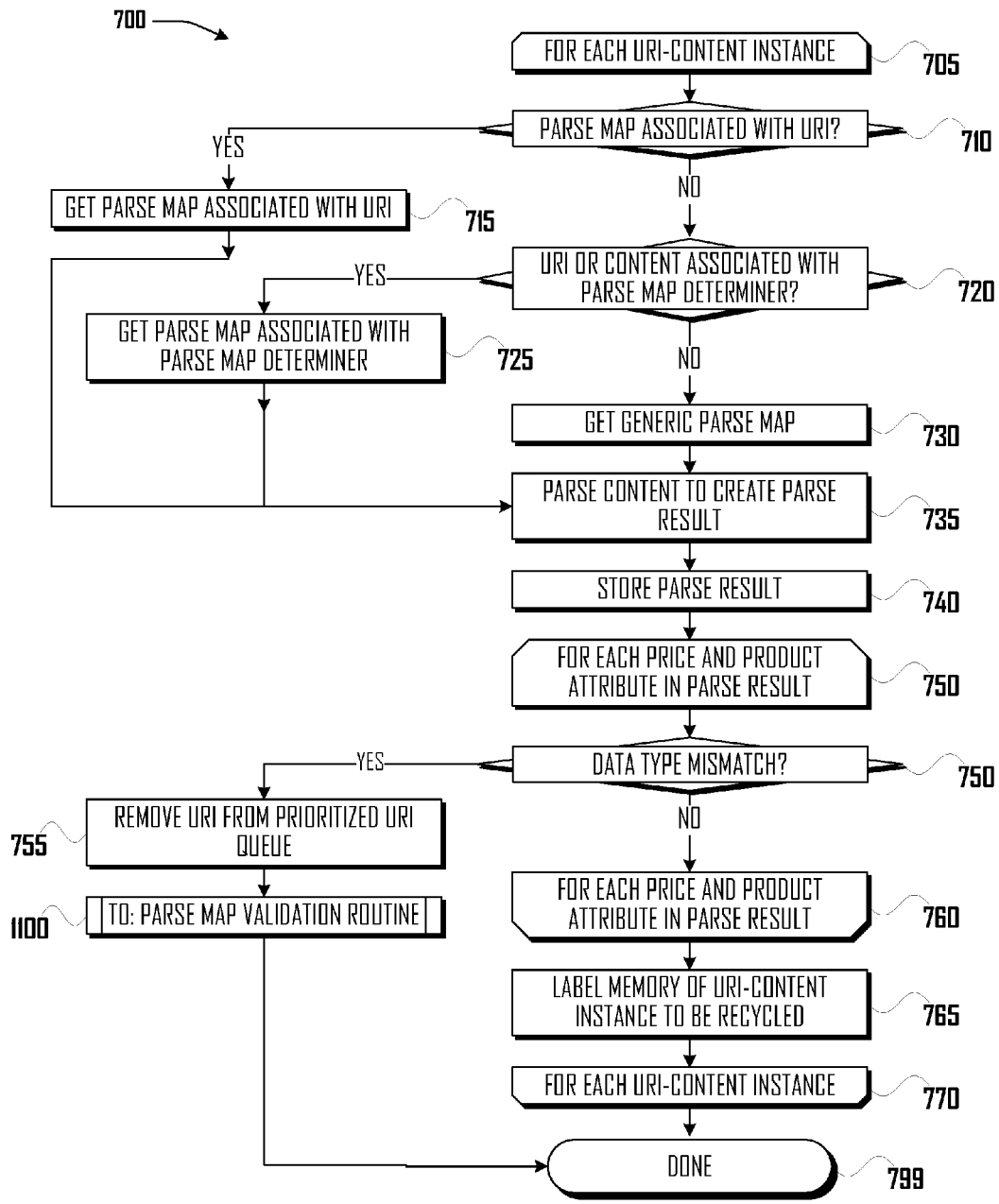
FIG. 7 is a flowchart illustrating an embodiment of a Parser Routine 700 for parsing a URI-Content Instance 310 and saving a Parse Result 325.

FIG. 7 is a flowchart illustrating an embodiment of a Parser Routine 700 for parsing a URI-Content Instance 310 and saving a Parse Result 325. The Parser Routine 700 may be executed by, for example, the Indix Server 200. Blocks 705 to 770 may iterate over each URI-Content Instance 310 in the Indix Datastore 300. At block 710 a decision may be made regarding whether there is a Parse Map 315 associated with the URI 305 associated with the URI-Content Instance 310; the association may be via another record, such as via an iPID 330 (or MPID 332 or other Parse Map Determinor 320) associated with the URI 305, which iPID 330 may be associated with the Parse Map 315. If there is, then at block 715, the associated Parse Map 315 may be obtained. If there is not, then at block 720 a determination may be made regarding whether the URI 305 or the URI-Content Instance 310 is associated with a Parse Map Determiner 320. As above, this association may be via another record, such as via an iPID 330 (or MPID 332) associated with the URI 305, which iPID 330 (or MPID 332) may be associated with the Parse Map Determiner 320.

Parse Map Determiners 320 may be, for example, a Category 335 associated with a URI 305, and/or may be characteristic webpage and/or website stuctures or templates wherein Price and Product Attributes occur in association with specific HTML and CSS elements in the templates. The Parse Map Determiner 320 may comprise, for example, a webpage ecommerce platform (as may be provided by, for example, Ecommerce Platform 160), a store, a merchant, a domain name, and OpenGraph elements in HTML. The association of the URI 305 or the URI-Content Instance 310 with the Parse Map Determiner 320 may be according to a record in the Indix Datastore 300 and/or may be identifiable in the URI-Content Instance 310. If the URI 305 or the URI-Content Instance 310 is associated with a Parse Map Determiner 320, then at block 725 the Parse Map 315 associated therewith may be obtained. If the URI 305 or the URI-Content Instance 310 is not associated with a Parse Map Determiner 320, then at block 730 a generic Parse Map 315 may be obtained. The generic Parse Map 315 may be a Parse Map 315 not associated with a specific URI 305. At block 735, the URI-Content Instance 310 may be parsed according to the Parse Map 315 to create a Parse Result 325. At block 740, the Parse Result 325 may be stored, for example, in the HBase Database 135.

Blocks 750 to 760 may iterate for each of or sets of Attributes 340/345 in the Parse Result 325. At block 750, a determination may be made by the Parser Routine 700 regarding whether there are one or more data type mismatches between expected data types for Attributes 340/345 and the data type of the data stored or attempted to be stored in the Attribute 340/345 in the Parse Result 325. For example, a Price Attribute 340 may be a "Sale Price" which is expected to be a currency amount while the content of the record (or attempted to have been stored in the record) may a date, an image, text, or a value for another non-currency data type. The non-matching data may or may not be stored in the Attribute 340/345, though the attempt to store the non-matching data (and a resulting error message) may be noted and stored in an equivalent record. In relation to a URI-Content Instance 310 the number and type of data type mismatches may be recorded and scored with different weights for different data type mismatches.

If a data type mismatch was determined (or a data type mismatch score above a threshold was calculated) at block 750, then at block 755 the URI 305 associated with the URI-Content Instance 310 may be removed from the URI Queue 355 and, optionally at block 1100, the Parse Map Validation Routine 1000 may be performed relative to the Parse Map 315 utilized to parse the URI-Content Instance 310. If a data type mismatch was not determined (or a data type mismatch score bellow a threshold was calculated) at block 750, then at block 760 the Parser Routine 700 may iterate over the next Attribute 340/345 or set thereof.

At block 765, the memory corresponding to the URI-Content Instance 310 may optionally be labeled to be deleted, recycled, reused, or otherwise discarded. At block 770 the Parser Routine 700 may iterate over the next URI-Content Instance 310. At block 799, the Parser Routine 700 may conclude.

Figure 8:
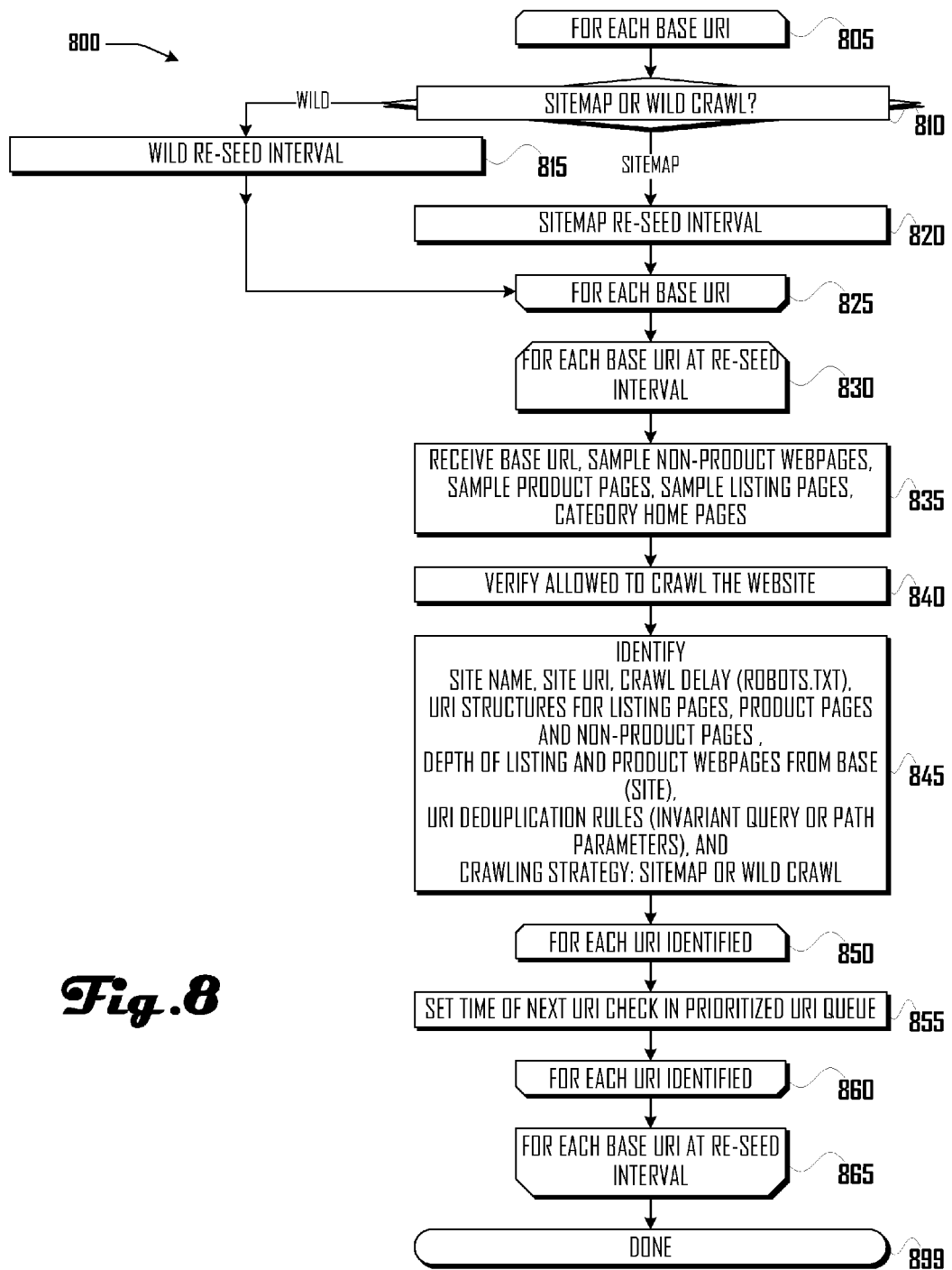
FIG. 8 is a flowchart illustrating an embodiment of a Seeder Routine 800 for identifying URIs 305 which contain Price or Product Attributes and adding the URIs to the URI Queue 355.

FIG. 8 is a flowchart illustrating an embodiment of a Seeder Routine 800 for identifying URIs 305 which contain Price or Product Attributes and adding the URIs to the URI Queue 355. The Seeder Routine 800 may be executed by, for example, the Indix Server 200.

The Seeder Routine 800 may be executed regularly on base URIs already in the Indix system to ensure that all URIs at a particular domain name are being explored.

At block 805 a base URI may be obtained, for example, from the URI 305 records or from an external source of URIs. For each base URI a determination may be made at block 810 whether the URI 305 is associated with a "sitemap" or a "wild" crawl, such as by checking, if available, the Webpage Type 350 record, which record may have been developed previously. For "wild" crawl URIs, at block 815 the Wild Re-Seed Interval may be set while, at block 820, the Sitemap Re-Seed Interval may be set. The Wild Re-Seed Interval may be set to be shorter than the Sitemap Re-Seed Interval. At block 825, the Seeder Routine 800 may return to iterate over the next base URI in a block of base URIs or, for example, the Seeder Routine 800 may proceed to block 830.

At block 830, a base URI either a first time or at its Re-Seed Interval may be obtained. At block 835, the Seeder Routine 800 receives input information such as, for example, a base URI, sample non-Product Pages, sample Product Pages, sample Listing Pages, and sample category home pages (pages listing products according to categories).

At block 840, the Seeder Routine 800 verifies that a Crawl Agent 400 will be allowed to crawl the website by, for example, requesting the Content at, for example, the base URI. At block 845, the Seeder Routine 800 identifies in the Content the site name, site URI, the crawl delay, the contents of a "robots.txt" file, the URI structures for Listing Pages, Product Pages, and non-Product Pages, the depth of Listing and Product Pages from the base URI, deduplication rules (such as invariant query or path parameters), and whether the crawling strategy for the website will be according to a sitemap or whether the crawling strategy will be a "wild crawl," wherein all or substantially all URIs on all pages are identified and followed.

Blocks 850 through 860 may iterate over all URIs 305 identified at block 845. At block 855, the Time of Next Check 360 for the URI 305 may be set in the URI Queue 355. At block 860*, the Seeder Routine 800 may iterate over the remaining URIs 305 identified at block 845. At block 865 the Seeder Routine 800 may conclude iterating over the then-current base URI. At block 899, the Seeder Routine 800 may terminate and/or return to block 830.

Figure 9A:
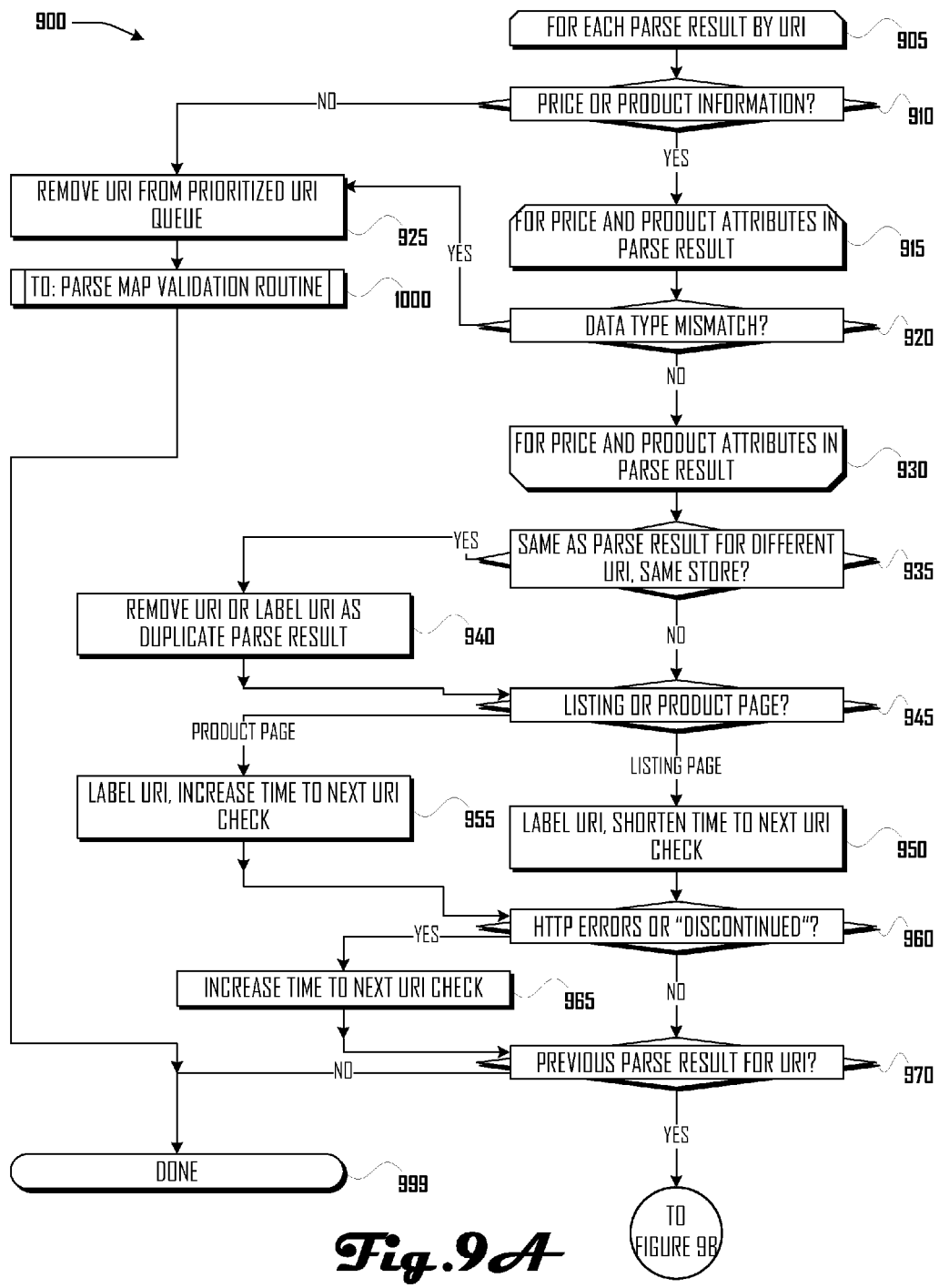
FIGS. 9A and 9B are flowcharts illustrating an embodiment of a URI Queue Manager Routine 900.
Figure 9B:
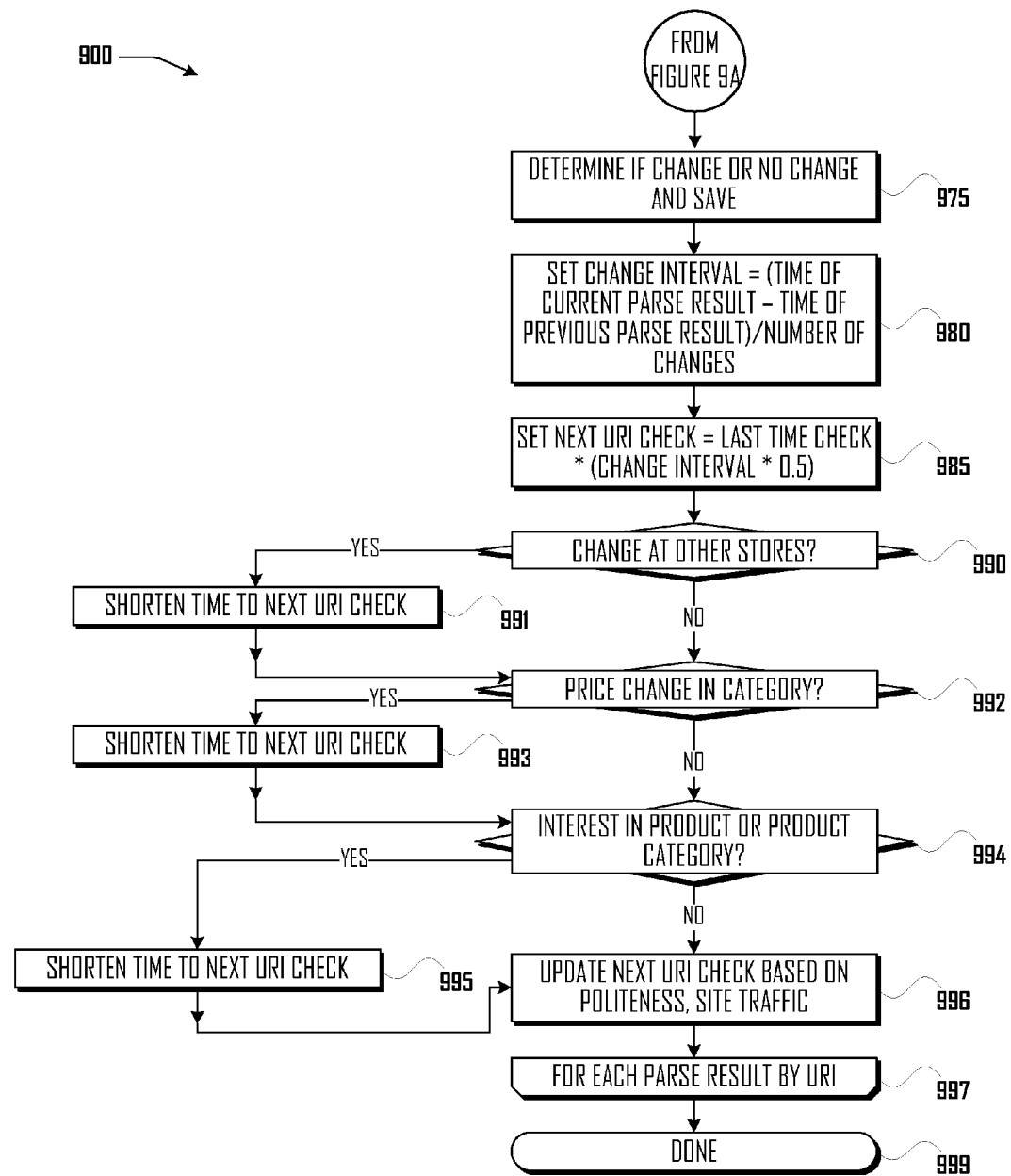

FIGS. 9A and 9B are flowcharts illustrating an embodiment of a URI Queue Manager Routine 900. Blocks 905 through 997 may iterate over each Parse Result 325 stored in the Indix Datastore 300. At block 910 a determination may be made regarding whether the Parse Result 325 comprises an Attribute 340/345. If not, then at block 925, the URI 305 associated with the Parse Result 325 may be removed from the URI Queue 355 and, optionally, the process may then proceed to block 1000 and execution of the Parse Map Validation Routine 1000.

If the determination at block 910 was that the Parse Result 325 comprises an Attribute 340/345, which determination may further comprise determining that the URI 305 is associated with an iPID 330, then Blocks 915 to 930 may iterate for each or sets of Attributes 340/345 in the Parse Result 325. At block 920, a determination may be made by the URI Queue Manager Routine 900 regarding whether there are one or more data type mismatches between expected data types for Attributes 340/345 and the data type of the data stored or attempted to be stored in the Attribute 340/345 in the Parse Result 325.

If a data type mismatch was determined (or a data type mismatch score above a threshold was calculated) at block 920, then at block 925 the URI 305 associated with the URI-Content Instance 310 may be removed from the URI Queue 355 and, optionally at block 1000, the Parse Map Validation Routine 1000 may be performed relative to the Parse Map 315 utilized to parse the URI-Content Instance 310. If a data type mismatch was not determined (or a data type mismatch score bellow a threshold was calculated) at block 920, then at block 930 the URI Queue Manager Routine 900 may iterate over the next Attribute 340/345 or set thereof and/or may proceed to block 935.

At block 935 a determination may be made regarding whether the Parse Result 325 is the same as a Parse Result 325 for a different URI 305 (or a different iPID 330), but the same store. Because of the operation of the Parse Map 315 and the Parser Routine 700, the webpages underlying the two identical Parse Results 325 may have different Content, though the same Attributes 340/345, so they result in the same Parse Results 325. If the same Parse Results 325 are determined at block 935, then at block 940 the URI 305 may be removed from the URI Queue 355 and/or may be labeled as a duplicative Parse Result 325; the iPIDs 330 for the URIs 305 may also be labeled as equivalent in, for example, the Equivalent iPID 334 record.

At block 945, which may follow block 935 if no same Parse Result 325 was determined, a determination may be made regarding whether the Parse Result 325 is for a Listing Page or a Product Page or other Webpage Type 350. This determination may be made based on whether more than one product can be identified in the Parse Result 325, in which case it may be classified as a Listing Page. Because of the greater efficiency in processing Listing Pages, Listing Pages may be crawled more frequently. If at block 945 the determination was that the Parse Result 325 was for a Product Page, then at block 955 the Webpage Type 350 of the URI 305 associated with the Parse Result 325 may be stored and the Time to Next Check 360 of the URI 305 may be increased. If at block 945 the determination was that the Parse Result 325 was for a Listing Page, then at block 950 the Webpage Type 350 of the URI 305 associated with the Parse Result 325 may be stored and the Time to Next Check 360 of the URI 305 may be decreased.

At block 960 a determination may be made regarding whether there are HTTP errors in the communication session relating to the Parse Result 325 or whether an Attribute 340/345 in the Parse Result 325 (such as an "Availability" Attribute) includes the text or otherwise indicates "discontinued." If so, then at block 965 the Time to Next Check 360 may be increased.

If not at block 960, then at block 970 a determination may be made regarding whether there is a previous Parse Result 325 for the URI 305. If not, then at block 999 the URI Queue Manager Routine may conclude and/or may return to iterate over the next Parse Result 325.

Turning to FIG. 9B, at block 975 a determination may be made regarding whether the Parse Results 325 of block 970 are the same or different, with the result being saved. At block 980 the Change Interval for the Parse Results 325 of 970 may be calculated as the time of the most recent Parse Result 325 minus the time of the earliest Parse Result 325 of block 970, divided by the number of changes between the Parse Results 325. At block 985, the Time to Next Check 360 may be set as the previous Time to Next Check 360 multiplied by one-half of the Change Interval calculated at step 980.

At block 990, a determination may be made regarding whether there has been a change in price in the equivalent Parse Result 325 for products associated with the MPID 332 associated with the URI 305 (if any), which will identify a change in the price for the same product at other stores or merchants. If there has been, then at block 991, the Time to Next Check 360 maybe decreased.

At block 992, a determination may be made regarding whether there has been a change in price in the Parse Results 325 for a Category 335 associated with the iPID 330 or MPID 332. If there has been, then at block 993, the Time to Next Check 360 may be decreased.

At block 994, a determination may be made regarding whether there has been interest in the Product, iPID 330, MPID 332, or Categories 335 in search queries submitted by Client Devices 105. If there has been, then at block 995, the Time to Next Check 360 may be decreased.

At block 996 the Time to Next Check 360 may be updated based on factors such as, for example, politeness, such as according to a "robots.txt" or part thereof associated with or found in the Parse Result 325, and/or site traffic for a website associated with the Parse Result 325, which site traffic may be reported by a third party.

At block 997, the URI Queue Manager Routine 900 may iterate over the next Parse Result 325. At block 999, the URI Queue Manager Routine 900 may terminate.

Figure 10:
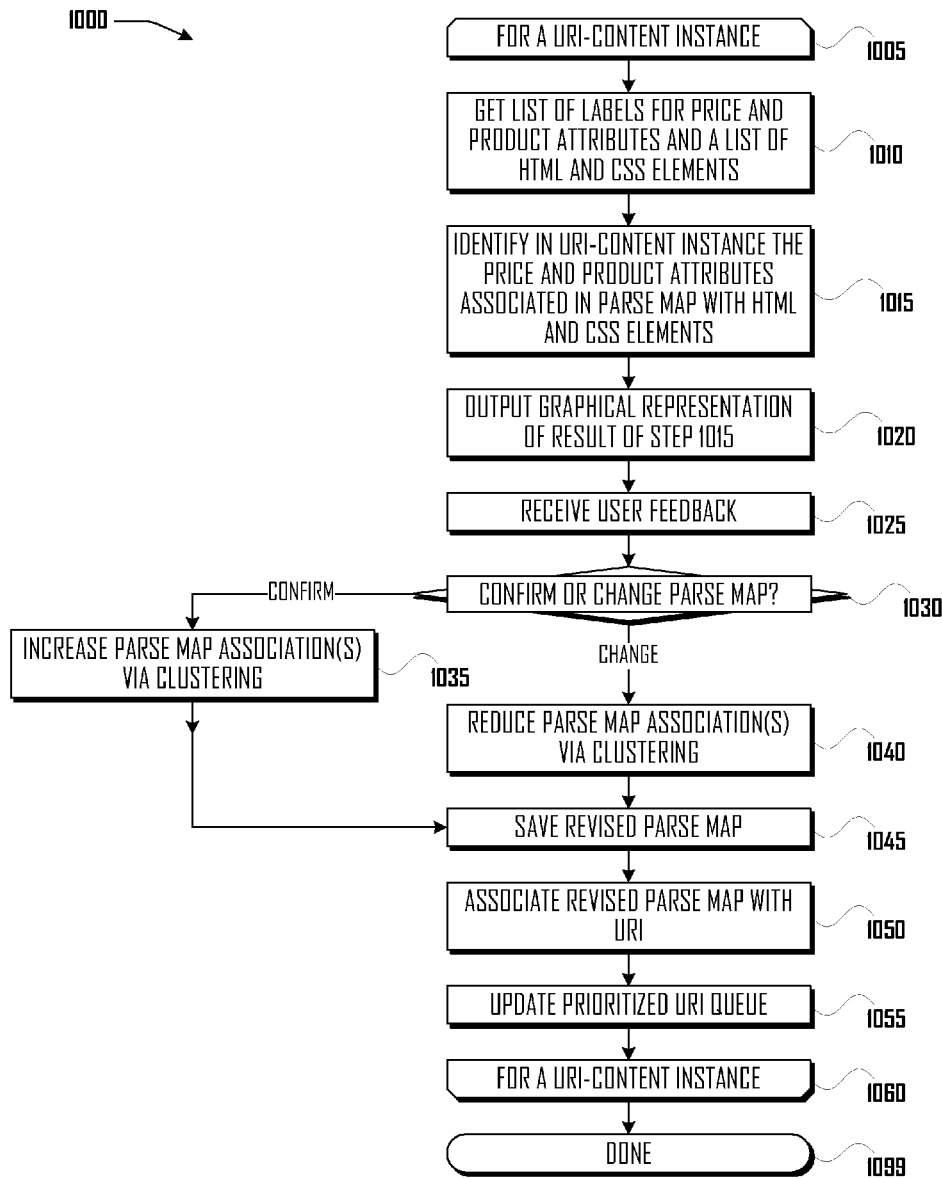
FIG. 10 is a flowchart illustrating an embodiment of a Parse Map Validation Routine 1000.
Figure 11:
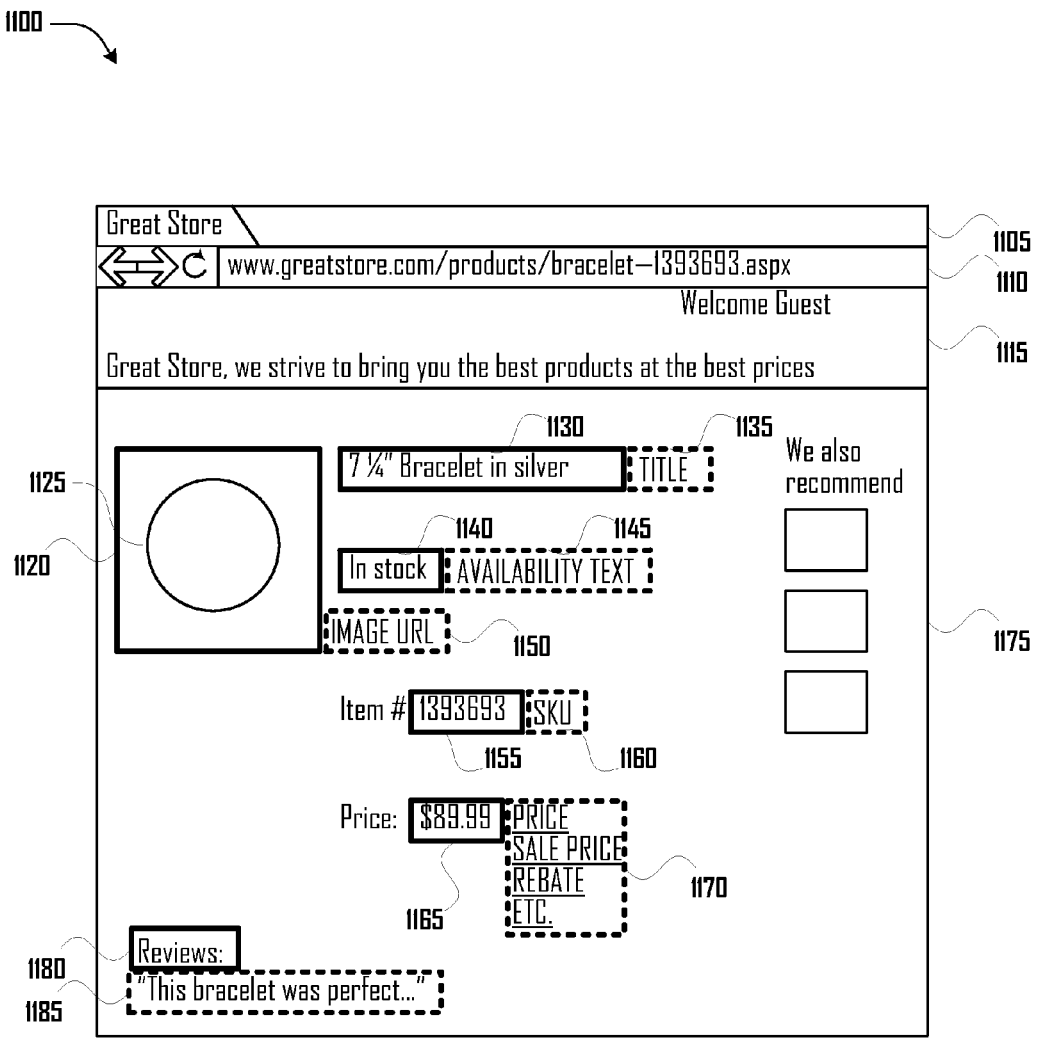
FIG. 11 is an illustration of a browser window showing a webpage with HTML and CSS elements corresponding to Attributes being labeled with Attribute names.

FIG. 10 is a flowchart illustrating an embodiment of a Parse Map Validation Routine 1000. Blocks 1005 through 1060 may iterate over URI-Content Instances 310. At block 1010, the Parse Map Validation Routine 1000 may obtain a list of labels for HTML and CSS elements and a list of Attributes 340/345. At block 1015, the Parse Map Validation Routine 1000 may identify in the HTML and CSS elements in the URI-Content Instance 310 the Attributes 340/345 identified by the Parse Map 315 associated with the URI 305 for the URI-Content Instance 310. At block 1020, the Parse Map Validation Routine 1000 may output a graphical representation of the result of block 1015. An example of this is shown in FIG. 11.

At block 1025 user feedback may be received from, for example, Client Devices 105. User feedback may be provided by, for example, the user selecting an Attribute 340/345 identified in the graphical output of block 1020, and changing the Attribute 340/345, such as by selecting a different Attribute 340/345 from a drop-down box or the like, which selected Attribute 340/345 may then be associated with the corresponding HTML or CSS element. See, for example, element 1170.

At block 1030 a determination may be made regarding whether the user feedback confirms or changes the Parse Map 315. If the user feedback confirms the Parse Map 315, then at block 1035, the Parse Map 315 associations may be increased via a clustering algorithm. If the user feedback changes the Parse Map 315, then at block 1035, the Parse Map 315 associations may be decreased via a clustering algorithm. The clustering algorithm may group user feedback by HTML and CSS element relative to corresponding Attributes 340/345, with the largest grouping from all the users being assigned to the Parse Map 315. Alternatively, a user or type of user (such as an administrator) may be given more weight than other users, such that such user's association is assigned to the Parse Map 315 regardless of the associations assigned by other users.

At block 1045, the revised Parse Map 315 may be saved and, at block 1050, may be associated with the URI 305. At block 1055 the URI Queue 355 may be updated, for example to add back a URI 305 to the URI Queue 355 which may have been removed, for example, due to a data type mismatch.

Block 1060 indicates a return to iterate over the next URI-Content Instance 310. Block 1099 indicates termination of the Parse Map Validation Routine 1000.

FIG. 11 is an illustration of a browser window showing a webpage with HTML and CSS elements corresponding to Attributes being labeled with Attribute names. Element 1100 is a browser window within, for example, a Client Device 105. In this example, the browser window 1100 relates to a single product, namely a bracelet. The browser window comprises a Tab Line 1105, an Address Line 1110, a Top Paragraph 1115, and a Product Box 1175. The Product box 1175 contains information relating to a bracelet.

Within the Product Box 1175, certain components are identified with a solid heavy-line box while other components are identified with a dashed heavy-line box. The heavy-line boxes (dashed or solid) are not present in the native source code for the webpage, but are added by the Parse Map Validation Routine 1000, discussed in FIG. 10.

Element 1120 is a heavy-line box drawn around an image frame, the image frame being identified from HTML and/or CSS elements in the source code for the webpage. Within Image Frame 1120 is a Bracelet Image 1125 (in FIG. 11, the bracelet is labeled with number 1125, though Bracelet Image 1125 may occupy more of the heavy-line box 1120). Appended to the lower right-hand corner of the Image Frame 1120, in dashed heavy-line box 1150 is text of the Attribute, "Image URL," which indicates that the Parse Map Validation Routine 1000 has identified this portion of the HTML and/or CSS code for the webpage as containing the "image URL" Attribute and has added the text "image URL" to the webpage to identify that this Attribute is associated with this component of the webpage.

Element 1130 is a heavy-line box drawn around a paragraph (or other text container) which is the next paragraph after Image Frame 1120, per the HTML and/or CSS elements in the source code for the webpage. Within Paragraph 1130 is the text "7¼" Bracelet in silver," which text is from the source code for the webpage. The HTML source code for the webpage may recite, for example, "<title>7¼" Bracelet in silver|Blue Nile</title>." Appended to the Paragraph 1130, in dashed heavy-line box 1135, is text of the Attribute, "Title," which indicates that the Parse Map Validation Routine 1000 has identified this portion of the HTML and/or CSS code for the webpage as containing the "title" Attribute and has added the text "Title" to the webpage to identify that this Attribute is associated with this component of the webpage.

Element 1140 is a heavy-line box drawn around a paragraph (or other text container) which contains the words "In stock," which text is from the source code for the webpage. Appended to the Paragraph 1140, in dashed heavy-line box 1145, is text of the Attribute, "Availability Text," which indicates that the Parse Map Validation Routine 1000 has identified this portion of the HTML and/or CSS code for the webpage as containing the "Availability Text" Attribute and has added the text "Availability Text" to the webpage to identify that this Attribute is associated with this component of the webpage. This text may be identified as this Attribute because the words, "In stock" may be associated with this Attribute in the Parse Map Validation Routine 1000.

Element 1155 is a heavy-line box drawn around a paragraph (or other text container) which contains the numbers "1393693," which number is from the source code for the webpage. Appended to the Paragraph 1155, in dashed heavy-line box 1160, is text of the Attribute, "SKU," which indicates that the Parse Map Validation Routine 1000 has identified this portion of the HTML and/or CSS code for the webpage as containing the "SKU" Attribute and has added the text "SKU" to the webpage to identify that this Attribute is associated with this component of the webpage. This text may be identified as this Attribute because the words, "Item #" followed by a number may be associated with this Attribute in the Parse Map Validation Routine 1000.

Element 1165 is a heavy-line box drawn around a paragraph (or other text container) which contains the currency value "$89.99," which currency value is from the source code for the webpage. Appended to the Paragraph 1165 is dashed heavy-line box 1170 containing text of several Attributes, in this example, "Price," "Sale Price," and "Rebate." In this embodiment, which is provided as an example, this indicates that the Parse Map Validation Routine 1000 has identified this portion of the HTML and/or CSS code for the webpage as containing the "Price" Attribute. The HTML may recite, for example, "<div class="strong">Price:</div><div class="value">$89.99</div>." In this embodiment, a user has selected box 1170 and activated a list of alternative Attributes (which may be selected by the Parse Map Validation Routine 1000 because they match the data type of the data in box 1165 and sent to the Client Device). In this embodiment, the user may select one of the alternative Attributes from this list, which selection may be transmitted back to, for example, the Parse Map Validation Routine 1000, as discussed above in relation to FIG. 10.

Figure 12:
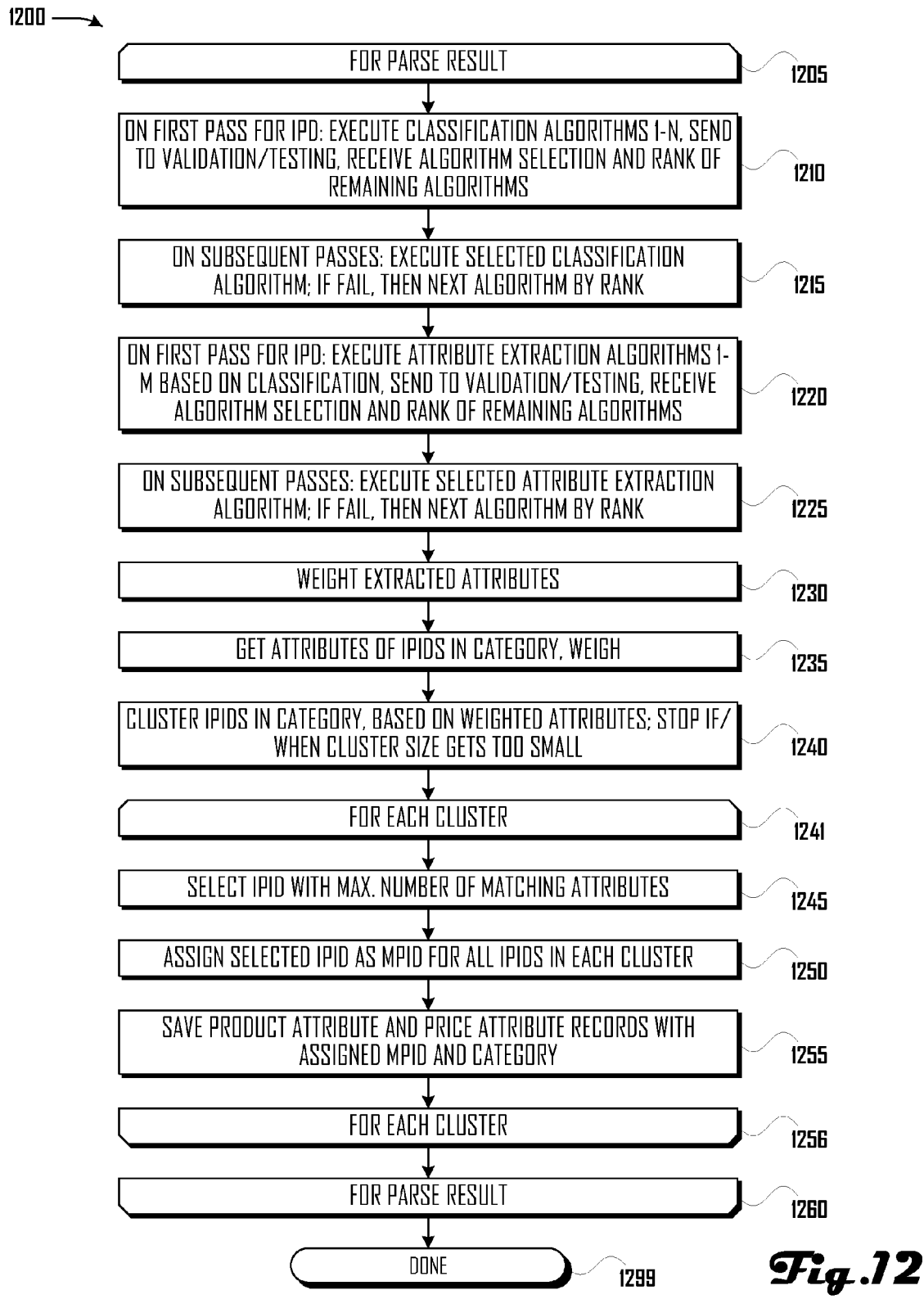
FIG. 12 is a flowchart illustrating an embodiment of an MPID Assigner Routine 1200.

FIG. 12 is a flowchart illustrating an embodiment of an MPID Assigner Routine 1200. Blocks 1205 to 1260 iterate for successive Parse Results 325. At block 1210, for a first pass of the MPID Assigner Routine 1200, a set of machine-learning algorithms 1-N are executed relative to the Parse Result 325 to classify the Parse Result 325 within the Category 335 taxonomy based on, for example, the URI 305. The different algorithms have different criteria and may or may not produce the same result. For example, one algorithm may place the Parse Result 325 in a Category 335 such as "Tools & Hardware>Tools>Hand Tools>Pliers" while another algorithm may place the Parse Result 325 in a Category 335 such as "Tools & Hardware>Tools>Hand Tools>Screw Drivers." For this first pass, the results of the classification algorithms 1-N may be sent to a testing and validation process, which may include screening for data-type mismatches and/or human review of the results. The testing and validation process may return a ranking of the results by each algorithm. At box 1215, in a subsequent (not first) pass the classification algorithm selected at step 1210 may be executed. If the selected algorithm fails, then the next classification algorithm by rank may be selected and performed relative to the Parse Result 325. The output is a Category 335 assigned to the Parse Result 325.

At box 1220, for a first pass of the MPID Assigner Routine 1200, the MPID Assigner Routine 1200 may execute Attribute 340/345 extraction algorithms 1-M on the Parse Result 325. The extraction algorithms 1-M may be selected based on the Category 335 assigned at step 1215. Similar to above, the results of the attribute extraction algorithms 1-M may be sent to a testing and validation process, which may include screening for data-type mismatches and/or human review of the results. The testing and validation process may return a ranking of the results by each algorithm. At box 1225, in a subsequent (not first) pass the attribute extraction algorithm selected at step 1220 may be executed. If the selected algorithm fails, then the next classification algorithm by rank may be selected and performed relative to the Parse Result 325.

At box 1230, the extracted Attributes 340/345 may be weighted, for example, to weigh certain Attributes 340/345, such as product codes or webpage titles, more heavily than other Attributes 340/345. There may be, for example, four weight factors assigned to each of the Attributes 340/345.

At box 1235, the MPID Assigner Routine 1200 may get the Attributes 340/345 of all iPIDs 330 in the Category 335 assigned at box 1215. If not already weighted (as in step 1230), the MPID Assigner Routine 1200 may weight the Attributes 340/345 according to, for example, the four weight factors.

At box 1240, the MPID Assigner Routine 1200 may cluster the IPIDs 330 in the Category 335 based on the weighted Attributes 340/345 of boxes 1230 and 1235. Because certain Attributes 340/345 are weighted more heavily than others, a match between product codes (such as a UPC number) for two different iPIDs 330 will likely result in the Attribute 340/345 cluster locating the two different iPIDS 330 proximate to one another. Clustering may proceed through progressively smaller clusters until the cluster size grows too small, for example, if each cluster contains just two or one iPID 330, at which point the MPID Assigner Routine 1200 may stop clustering and may "back off" one or two cluster steps, until the cluster size is no longer too small.

At box 1245, the MPID Assigner Routine 1200 may identify the iPID 330 in the Category 335 in each cluster which has the maximum number of Attributes 340/345 in common with other iPIDs 330 in that particular level of the Category 335 taxonomy and in that cluster. At box 1250 the MPID Assigner Routine 1200 may assign the iPID 330 identified at box 1245 as the MPID 332 for all the iPIDs 330 in that particular level of the Category 335 taxonomy and in that cluster. At box 1255, the extracted attributes (not weighted) may be saved as Price Attributes 340 and Product Attributes 345 with the MPID 332 assigned at box 1250 and with the Category 335 assigned at step 1215. At box 1260 the MPID Assigner Routine 1200 may return to iterate over the next Parse Result 325 and, at box 1299, the MPID Assigner Routine 1200 may end.

FIG. 13 is a flowchart illustrating an embodiment of an Export Routine 1300. The Export Routine 1300 handles new and updated Product Attribute 345 and new Price Attribute 340 records which are saved at box 1255 in FIG. 12 by the Assigner Routine 1200. At box 1305. the Export Routine 1300 may merge the Product Attribute 345 record of box 1255 with the previous Product Attribute 345 record for the iPID 330; multiple Product Attribute 345 records for an iPID 330 may not he kept.

At box 1310, the Export Routine 1300 may save the Price Attribute 340 record of box 1255 for the iPID 330; multiple Price Attribute 340 records for an iPID 330 may be saved.

The set of Price Attribute 340 records and the updated Product Attribute 345 record saved in association with one iPID 330 may be referred to as the "PriceDNA" for the iPID 330.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A computer implemented method of managing a prioritized Uniform Resource Identifier ("URI") queue comprising:

by a first computer processor, utilizing a first URI to access a first content in a first communication session with a first webserver associated with a first merchant at a first URI access time and utilizing the first URI to access a second content in a second communication session with the first webserver at a second URI access time subsequent to the first URI access time;

by the first or a second computer processor, parsing the first content for first price and product attribute values, saving the result as a first parse result associated with a first product in a first computer memory, and associating the first parse result with a first URI-specific product identifier;

by the first or the second computer processor, parsing the second content for second price and product attribute values, saving the result as a second parse result associated with the first product in the first computer memory, and associating the second parse result with a first merchant-specific identifier;

by the first or the second computer processor, determining at least one difference between the first price and product attribute values in the first parse result and the second price and product attribute values in the second parse result; and setting a time to next check of the first URI in the prioritized URI queue at least according to the determined difference between the first price and product attribute values in the first parse result and the second price and product attribute values in the second parse result.

2. A computer apparatus for managing a prioritized Uniform Resource Identifier ("URI") queue comprising:

a first computer processor and memory comprising a crawl agent software routine and a second computer processor and memory comprising a URI queue manager software routine;

wherein the crawl agent software routine is to utilize a first URI to access a first content in a first communication session with a first webserver associated with a first merchant at a first URI access time and utilize the first URI to access a second content in a second communication session with the first webserver at a second URI access time subsequent to the first URI access time;

wherein the URI queue manager software routine is to:

parse the first content for first price and product attribute values, save as a first parse result associated with a first product in a first computer memory, and associate the first parse result with a first URI-specific product identifier;

parse the second content for second price and product attribute values, save as a second parse result associated with the first product in the first computer memory, and associate the second parse result with a first merchant-specific identifier;

determine at least one difference between the first price and product attribute values in the first parse result and the second price and product attribute values in the second parse result; and set a time to next check of the first URI in the prioritized URI queue according to the determined difference between the first price and product attribute values in the first parse result and the second price and product attribute values in the second parse result.

3. One or more computer-readable media comprising instructions that cause a computer device, in response to execution of the instructions by one or more processors of the computer device to perform the following:

utilize a first URI to access a first content in a first communication session with a first webserver associated with a first merchant at a first URI access time and utilize the first URI to access a second content in a second communication session with the first webserver at a second URI access time subsequent to the first URI access time;

parse the first content for first price and product attribute values, save as a first parse result associated with a first product in a first computer memory, and associate the first parse result with a first URI-specific product identifier;

parse the second content for second price and product attribute values, save as a second parse result associated with the first product in the first computer memory, and associate the second parse result with a first merchant-specific identifier;

determine at least one difference between the first price and product attribute values in the first parse result and the second price and product attribute values in the second parse result; and set a time to next check of the first URI in the prioritized URI queue at least according to the determined difference between the first price and product attribute values in the first parse result and the second price and product attribute values in the second parse result.

4. A computer-implemented method for determining if products on different websites can be assigned same or different product identifiers, comprising:

by a first computer processor, receiving a first content from a first webpage from a first webserver associated with a first merchant, by the first computer processor, parsing the first content for a first set of product attribute values, saving as a first parse result, and associating the first parse result with a first URI-specific product identifier;

by the first computer processor, receiving a second content from a second webpage from a second webserver associated with a second merchant;

by the first computer processor, parsing the second content for a second set of product attribute values, saving as a second parse result, and associating the second parse result with a second URI-specific product identifier;

for a set of parse results comprising the first and second parse result, identifying at least one product attribute cluster in the set of parse results, and assigning a URI-independent product identifier to the product attribute cluster, wherein the product attribute cluster comprises parse results comprising a first product attribute value within a cluster range.

5. A computer apparatus for determining if products on different websites can be assigned same or different product identifiers, comprising:

a first computer processor and memory comprising an identifier assignment routine wherein the identifier assignment routine is to:

receive a first content from a first webpage from a first webserver associated with a first merchant;

parse the first content for a first set of product attribute values, save as a first parse result, and associate the first parse result with a first URI-specific product identifier;

receive a second content from a second webpage from a second webserver associated with a second merchant;

parse the second content for a second set of product attribute values, save as a second parse result, and associate the second parse result with a second URI-specific product identifier;

for a set of parse results comprising the first and second parse result, identify at least one product attribute cluster in the set of parse results, and assign a URI-independent product identifier to the product attribute cluster, wherein the product attribute cluster comprises parse results comprising a first product attribute value within a cluster range.

6. One or more computer-readable media comprising instructions that cause a computer device, in response to execution of the instructions by one or more processors of the computer device to perform the following:

receive a first content from a first webpage from a first webserver associated with a first merchant;

parse the first content for a first set of product attribute values, save as a first parse result, and associate the first parse result with a first URI-specific product identifier;

receive a second content from a second webpage from a second webserver associated with a second merchant;

parse the second content for a second set of product attribute values, save as a second parse result, and associate the second parse result with a second URI-specific product identifier;

for a set of parse results comprising the first and second parse result, identify at least one product attribute cluster in the set of parse results, and assign a URI-independent product identifier to the product attribute cluster, wherein the product attribute cluster comprises parse results comprising a first product attribute value within a cluster range.

7. The method according to claim 1, wherein determining at least one difference between the first price and product attribute values in the first parse result and the second price and product attribute values in the second parse result comprises determining a change interval.

8. The method according to claim 1, further comprising utilizing a second URI to access a third content in a third communication session with a second webserver associated with a second merchant, parsing the third content for third price and product attribute values, saving the result as a third parse result associated with a second product in the first computer memory, and associating the third parse result with a second merchant-specific product identifier.

9. The method according to claim 1, further comprising determining that a price attribute of the second product has changed over time and moving the time to check of the first URI up in position in the prioritized URI queue.

10. The method according to claim 1, further comprising determining that there is an interest in a product or a product category associated with the URI-specific product identifier and moving the time to check of the first URI up in position in the prioritized URI queue.

11. The method according to claim 4, wherein assigning the URI-independent identifier to the product attribute cluster comprises identifying, within all URI-specific product identifiers associated with the product attribute cluster, a URI-specific product identifier associated with a largest number of product attribute values in the product attribute cluster, and assigning such URI-specific product identifier as the URI-independent product identifier.

12. The method according to claim 4, further comprising, prior to identifying at least one product attribute cluster in the set of parse results, weighting the product attribute values in the set of product attribute values.

13. The method according to claim 4, further comprising, for the first and second parse results, determining at least one category associated therewith and wherein identifying at least one product attribute cluster in the set of parse results comprises selecting a set of product attributes shared by products in the at least one category, organizing the set of parse results by a set of product attributes shared within the at least one category, and identifying at least one product attribute cluster in the set of parse results further according to the set of product attributes shared within the at least one category.

14. The method according to claim 7, wherein the change interval is calculated at least in part by subtracting from a first time-date of the first parse result a second time-date of the second parse result and dividing this by a number of changes between the first and second parse results.

15. The method according to claim 8, further comprising, for a set of parse results for a set of content obtained from a set of webservers, wherein the set of parse results comprises the first and third parse result, wherein the set of webservers comprises the first and second webservers, and wherein the set of parse results comprises a set of price and product attributes comprising a first and a second product attribute, identifying at least one product attribute cluster in the set of parse results, and assigning a URI-independent identifier to the product attribute cluster, wherein the product attribute cluster comprises parse results comprising the first product attribute value within a cluster range.

16. The method according to claim 10, wherein the interest comprises search queries submitted by client computer devices.

17. The method according to claim 13, wherein determining at least one category associated with the first and second parse results comprises, for each parse result, selecting a set of attribute extraction algorithms, executing the attribute extraction algorithms on the parse result, ranking the attribute extraction algorithms within the set based at least on data-type mismatches, and assigning the at least one category to the parse result based on a highest ranking attribute extraction algorithm.

18. The method according to claim 15, further comprising weighting the first and second product attributes by different weighting factors and wherein identifying the product attribute cluster in the set of parse results based at least in part on the first and the second product attribute in the set of product attributes comprises identifying the product attribute cluster based at least in part on the weighted first and second product attributes.

19. The method according to claim 15, wherein the first and second products are in the same product attribute cluster and are associated with a same merchant-independent identifier.

20. The method according to claim 19, further comprising determining that a price associated with a parse result for a category has changed over time and, in response, moving the time to check of the first URI up in position in the prioritized URI queue.

* * * * *